US 7,374,059 B2

(12) United States Patent
Morgan et al.

(10) Patent No.: US 7,374,059 B2
(45) Date of Patent: May 20, 2008

(54) COVERING SYSTEMS AND VENTING METHODS

(75) Inventors: William D. Morgan, Edina, MN (US);
Michael A. Morgan, Edina, MN (US);
Michael S. Gallant, Richfield, MN (US)

(73) Assignees: Industrial and Environmental Concepts, Inc., Minneapolis, MN (US);
Agri Covers, Inc., Minneapolis, MN (US)

( * ) Notice: Subject to any disclaimer, the term of this patent is extended or adjusted under 35 U.S.C. 154(b) by 343 days.

(21) Appl. No.: 10/003,037

(22) Filed: Nov. 2, 2001

(65) Prior Publication Data

US 2003/0066789 A1    Apr. 10, 2003

Related U.S. Application Data

(63) Continuation-in-part of application No. 09/972,719, filed on Oct. 5, 2001, now abandoned.

(51) Int. Cl.
*B65D 88/34* (2006.01)
*B65D 88/38* (2006.01)
*B65D 88/00* (2006.01)

(52) U.S. Cl. .................. 220/216; 220/219; 220/227; 220/226; 210/603; 405/52

(58) Field of Classification Search ............... 210/603, 210/605, 615, 621, 630, 150, 195.1, 903, 210/608; 96/155, 193, 220, 241, 248; 52/5, 52/266, 23; 220/227, 219, 216, 226, 368; 405/1, 68, 70, 52; 55/5, 266, 23
See application file for complete search history.

(56) References Cited

U.S. PATENT DOCUMENTS 2,952,024 A    9/1960    Bartolucci ............. 4/503

(Continued)

FOREIGN PATENT DOCUMENTS

CA    1253266    4/1989

(Continued)

OTHER PUBLICATIONS

"Proposals for Pond Membrane," Nov. 8, 1984.

(Continued)

*Primary Examiner*—Krishnan S. Menon
(74) *Attorney, Agent, or Firm*—Fulbright & Jaworski L.L.P.

(57) ABSTRACT

A covering system that includes a first membrane, a first flotation member coupled to the first membrane. The first flotation member includes a first float and a first float compartment membrane, and the first float compartment membrane is coupled to the first membrane. The covering system also includes a first plurality of gas-relief passageways positioned either within the first float compartment membrane, or within the first membrane and adjacent to the first flotation member. And at least one of the gas-relief passageways within the first plurality is structured so that gas flows unobstructed through it when the system is used. Gas-relief openings formed between overlapping membranes may also be utilized as avenues through which gas may escape to atmosphere from beneath the covers and covering systems. Venting methods are also disclosed. The covering systems and methods may be applied to control odor, algae growth, and heat loss associated with the retaining various liquids, while permitting for the controlled release of gases that are produced.

14 Claims, 16 Drawing Sheets

U.S. PATENT DOCUMENTS

| | | | | |
|---|---|---|---|---|
| 3,313,443 | A | 4/1967 | Dial et al. | 220/26 |
| 3,330,118 | A | 7/1967 | Biais | 61/0.5 |
| 3,572,506 | A * | 3/1971 | Bandy et al. | 210/86 |
| 3,683,428 | A | 8/1972 | Morris | 4/172.14 |
| 3,862,876 | A | 1/1975 | Graves | 161/44 |
| 3,933,628 | A | 1/1976 | Varani | 210/12 |
| 3,980,199 | A | 9/1976 | Kays | 220/227 |
| 3,991,900 | A | 11/1976 | Burke et al. | 220/219 |
| 4,135,257 | A | 1/1979 | Lof | 4/172.12 |
| 4,137,575 | A | 2/1979 | Klaffle et al. | 4/172.12 |
| 4,139,117 | A | 2/1979 | Dial | 220/218 |
| 4,169,050 | A | 9/1979 | Serfling et al. | 210/12 |
| 4,192,025 | A | 3/1980 | Hinsperger | 4/172.14 |
| 4,244,819 | A * | 1/1981 | Ballu | 210/242.3 |
| 4,294,589 | A | 10/1981 | Zachary | 55/36 |
| 4,438,863 | A * | 3/1984 | Wilson et al. | 220/227 |
| 4,503,988 | A | 3/1985 | Gerber | 220/219 |
| 4,603,790 | A | 8/1986 | Gerber | 220/219 |
| 4,672,691 | A | 6/1987 | De Garie et al. | 4/499 |
| 4,678,375 | A * | 7/1987 | Gagle et al. | 405/270 |
| 4,916,937 | A * | 4/1990 | Robertson et al. | 405/270 |
| 5,067,182 | A | 11/1991 | Koelsch | 4/494 |
| 5,265,976 | A | 11/1993 | Russell | 405/52 |
| 5,400,549 | A | 3/1995 | Morgan | 52/23 |
| 5,505,848 | A | 4/1996 | Landine et al. | 210/170 |
| 5,562,759 | A * | 10/1996 | Morgan et al. | 96/155 |
| 5,587,080 | A | 12/1996 | Landine et al. | 210/603 |
| 4,672,691 | A | 9/2000 | De Garie et al. | 4/499 |
| 6,136,194 | A * | 10/2000 | Vogel et al. | 210/605 |

FOREIGN PATENT DOCUMENTS

| | | |
|---|---|---|
| CA | 2060479 | 8/1992 |
| CA | 2116354 | 2/1994 |
| CA | 2102590 | 5/1994 |
| CA | 2173831 | 4/1995 |
| CA | 2096852 | 3/1999 |
| CA | 2323818 | 5/2001 |
| CA | 2326002 | 5/2001 |
| DE | 2004656 | 8/1971 |

OTHER PUBLICATIONS

Color copy of Lemna brochure published more than one year prior to the filing date of this application, date unknown.

Parsons, "On-farm biogas production," Cooperative Extension. Northeast Regional Agricultural Engineering Service, 1984.

Depiction of structure used in public more than one year prior to the filing date of this application, unknown date.

Photograph taken on Oct. 6, 2000; labeling described in Information Disclosure Statement.

Cross-sectional depiction of portion of subject of photographs taken on Oct. 6, 2000.

* cited by examiner

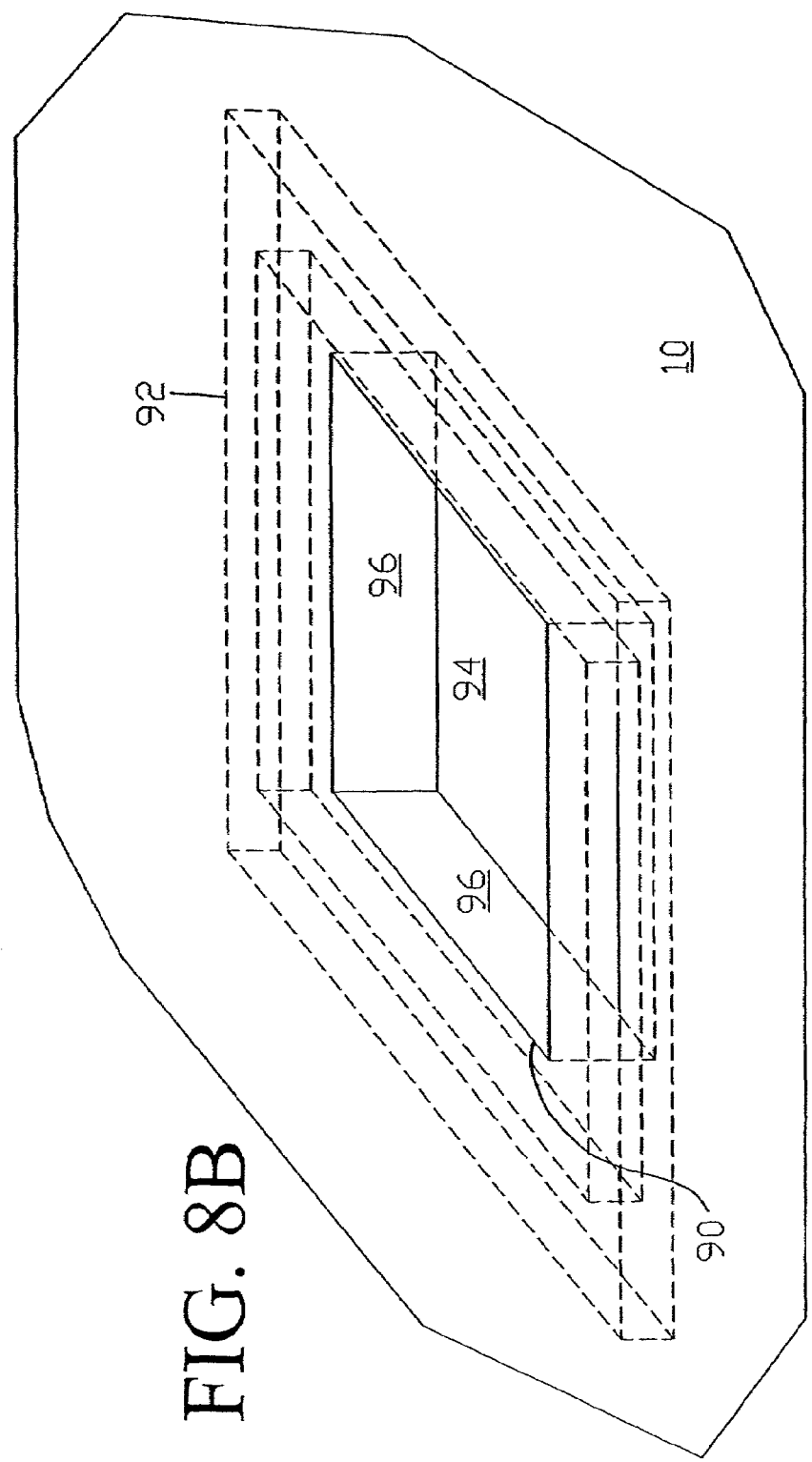

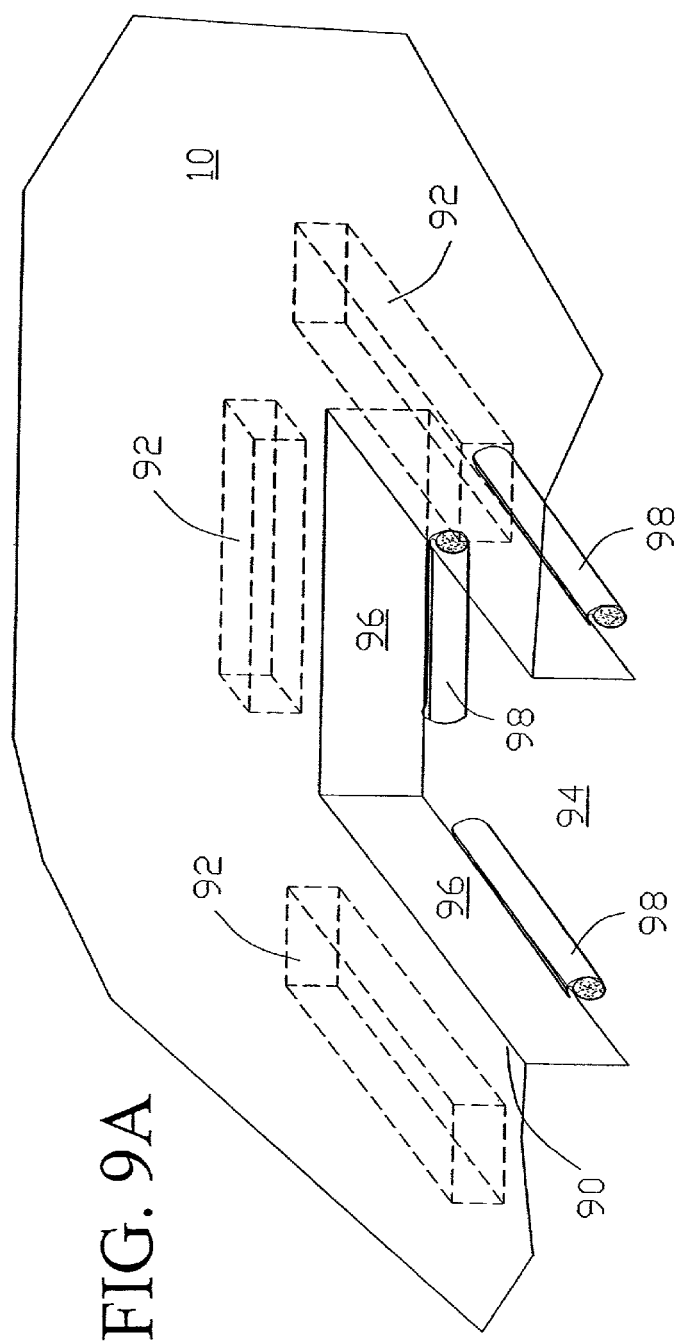

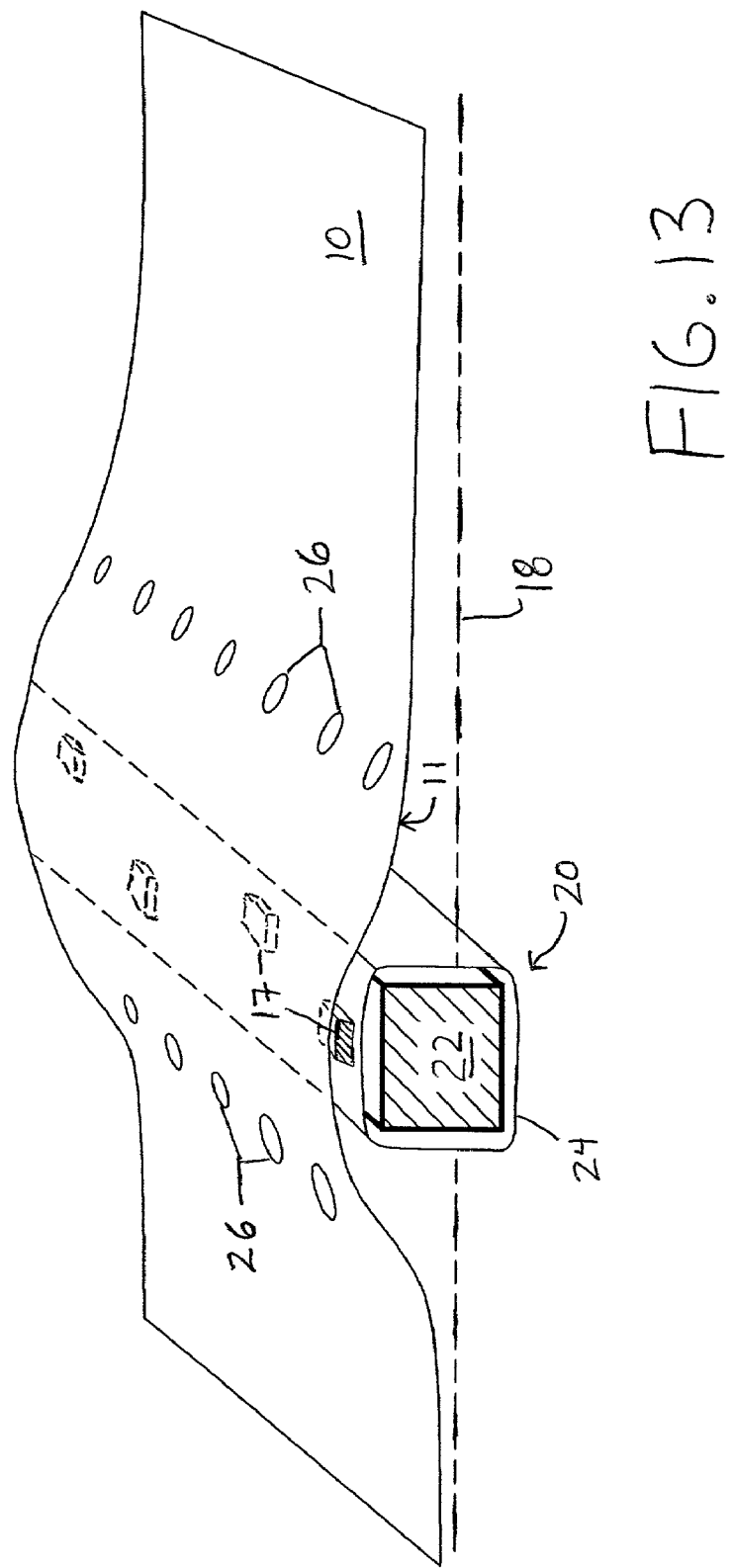

COVERING SYSTEMS AND VENTING METHODS

This application is a continuation-in-part of U.S. patent application Ser. No. 09/972,719, entitled "COVERING SYSTEMS AND VENTING METHODS," which was filed in the names of the presently-named inventors on Oct. 5, 2001 now abandoned.

BACKGROUND OF THE INVENTION

1. Field of the Invention

The present invention relates generally to covers for liquid-retaining structures, covering systems that utilize such covers, and venting methods.

2. Description of Related Art

Covers for liquid-retaining structures, such as lagoons, ponds, basins, and tanks, have existed for many years. Such liquid-retaining structures have been used in a variety of environments, including holding fresh water or wastewater for industrial, municipal, and/or agricultural operations, and the like. Covers have been used to address issues such as odors, algae growth, heat loss, and gas production and collection associated with the retained liquids. Such gases include, for example, methane and hydrogen sulfide. Examples of such covers include those found in U.S. Pat. Nos. 3,991,900, 4,438,863, 5,265,976, 6,136,194, 4,294,589, 5,400,549, and 5,562,759.

Despite their utility in certain areas, current covers do not offer a simple, inexpensive way to address issues such as odor control or algae control while providing the ability to release gas at the same time. While certain of the covers identified above, such as those depicted in U.S. Pat. Nos. 5,400,549 and 5,562,759 (the disclosures of both of which are incorporated herein by reference) provide for a modular construction, the disclosed modules include large, insulative enclosures that span nearly the entire space of the module. As a result, the modules are expensive. Additionally, while gaps exist between the connected modules through which gas may escape, the covers lack a controlled gas-release system that does not depend upon modules being connected to each other. Of the non-modular covers that exist, some employ expensive, complicated systems of gas control that include pipes for directing the gas and pumps to stimulate the movement of the gas.

SUMMARY OF THE INVENTION

The present covers, covering systems, and methods address the shortcomings of prior covers by providing a way to address issues such as odors, algae growth, and heat loss associated with the retaining various liquids, while permitting for the controlled release of gases that are produced. This is achieved through covers and covering systems that may be modular and, as a result, well-suited to covering any liquid-retaining structure, from lagoons to tanks. The modules may take the form of the present membranes. The modules may also take the form of the present membranes that are coupled to one or more of the present flotation members. The modules may be connected together by, for example, permanent connections (e.g., welds) or connections that are temporary (such as fasteners). The present covers and covering systems may be provided with various anchoring structures that allow the cover or covering system to be affixed to various structures such as pond banks or tank sides. By doing so, the likelihood that wind can get beneath the cover or covering systems and impair its effectiveness can be reduced or eliminated. Furthermore, the present covers and covering systems may be formed in part from membrane(s) that float by virtue of the material from which they are made and/or by virtue of the present flotation members.

In one embodiment, the present invention is a covering system that includes a first membrane and a first flotation member coupled to the first membrane. The first flotation member includes a first float and a first float compartment membrane, and the first float compartment membrane is coupled to the first membrane. The covering system also includes a first plurality of gas-relief passageways positioned either within the first float compartment membrane, or within the first membrane and adjacent to the first flotation member. At least one of the gas-relief passageways within the first plurality is structured so that gas flows unobstructed through it when the system is used.

In another embodiment of this covering system, the first float is sealed in the first float compartment membrane. In other embodiments of this covering system, the first float compartment membrane is coupled to the first membrane with at least either a flotation member tie or a flotation member strap. In another embodiment of this covering system, the first float compartment membrane is coupled to either an upper surface or a lower surface of the first membrane, and the first float is positioned between the first membrane and the first float compartment membrane. In another embodiment of this covering system, the first flotation member is coupled to the first membrane so as to elevate the first plurality of gas-relief passageways above at least a portion of the first membrane when the system is used.

In another embodiment of this covering system, the covering system includes a second membrane and a second flotation member coupled to the second membrane. The second flotation member includes a second float and a second float compartment membrane, and the second float compartment membrane is coupled to the second membrane. The covering system also includes a flotation member link coupling the first flotation member to the second flotation member, and a second plurality of gas-relief passageways positioned either within the second float compartment membrane, or within the second membrane and adjacent to the second flotation member. At least one of the gas-relief passageways within the second plurality is structured so that gas flows unobstructed through it when this embodiment of the covering system is used.

In still another embodiment of this covering system, the covering system includes a second flotation member coupled to the first membrane. The second flotation member includes a second float and a second float compartment membrane, and the second float compartment membrane is coupled to the first membrane. The second flotation member is spaced apart from the first flotation member. This embodiment of the covering system also includes a first elongated weight positioned on an upper surface of the first membrane and between the first and second flotation members.

In yet another embodiment of this covering system, the covering system includes a second elongated weight positioned on an upper surface of the first membrane at an angle to either the first flotation member, the second flotation member, or the first elongated weight.

In yet another embodiment of this covering system, the covering system includes an anchor system coupled to an edge of the first membrane. In one embodiment, the anchor system includes a weighted member extending along and coupled to at least a portion of the edge of the first membrane. In another embodiment of this covering system, the anchor system further includes a connector coupled to the edge of the first membrane. The connector may include a sleeve.

In still another embodiment of this covering system, the covering system further includes a service opening positioned within the first membrane. The service opening may be defined by a service opening edge and may be spaced apart from the first flotation member and the first plurality of openings. In this embodiment, the covering system further includes a second flotation member coupled to the first membrane so as to elevate the service opening edge above a body containing some liquid when the system is used. In this embodiment, the covering system also includes a service opening membrane coupled to the service opening edge. A service opening weight may be coupled to the service opening membrane and spaced apart from the service opening edge.

In another embodiment, the present invention is a covering system that includes a first membrane having a width and a first float coupled to the first membrane, the first float having a width that is not more than twenty-five percent of the width of the first membrane. In this embodiment, the covering system also includes a second membrane that is coupled to the first membrane so as to define gas-relief openings between the first and second membranes.

In another embodiment of this covering system, the first float is sealed in a first float compartment membrane, and the first float compartment membrane is coupled to the first membrane.

In still another embodiment of this covering system, the first float is coupled to the first membrane with a first float compartment membrane, and the first float compartment membrane is coupled to either an upper surface or a lower surface of the first membrane. In this embodiment, the first float is positioned between the first membrane and the first float compartment membrane.

In yet another embodiment of this covering system, the covering system also includes a second float that is coupled to the first membrane; the second float is spaced apart from the first float; and a first elongated weight is positioned on an upper surface of the first membrane and between the first and second floats. In yet another embodiment of this covering system, the covering system further includes a second elongated weight positioned on an upper surface of the first membrane at an angle to either the first float, the second float, or the first elongated weight.

In still another embodiment of this covering system, the covering system includes an anchor system coupled to an edge of the first membrane. In this embodiment, the anchor system includes a weighted member extending along and coupled to at least a portion of the edge of the first membrane. In another embodiment, the anchor system further includes a connector coupled to the edge of the first membrane. In another embodiment, the connector includes a sleeve.

In yet another embodiment of this covering system, the covering system has a service opening positioned within the first membrane, the service opening is defined by a service opening edge, and the service opening is spaced apart from the first float and the gas-escape openings. In this embodiment, the covering system includes a second flotation member coupled to the first membrane so as to elevate the service opening edge above a body containing some liquid when the system is used, and a service opening membrane coupled to the service opening edge. In another embodiment, this covering system further includes a service opening weight coupled to the service opening membrane and spaced apart from the service opening edge.

In another embodiment, the present invention is a floating cover that includes a first membrane and a service opening positioned within the first membrane. The service opening is defined by a service opening edge. In this embodiment, the floating cover also includes a flotation member coupled to the first membrane so as to elevate the service opening edge above a body containing some liquid when the system is used. In this embodiment, the floating cover also includes a service opening membrane coupled to the service opening edge. In another embodiment, the floating cover includes a service opening weight coupled to the service opening membrane and spaced apart from the service opening edge.

In another embodiment, the present invention is a venting method that includes coupling a first membrane to a first flotation member. The first flotation member includes a first float and a first float compartment membrane. The coupling includes coupling the first float compartment membrane to the first membrane. In this embodiment, the venting method also includes forming gas-relief passageways either within the first float compartment membrane, or within the first membrane and adjacent to the first flotation member. In this embodiment, the venting method includes elevating at least a portion of the first membrane so as to cause the first membrane to float when placed over a body containing some liquid, and so that gas from the body is unobstructedly vented to atmosphere through at least one of the gas-relief passageways. In another embodiment, the coupling includes welding the first float compartment membrane to the first membrane.

In another embodiment, the present invention is a venting method that includes coupling a first membrane having a width to a first float having a width that is not more than twenty-five percent of the width of the first membrane; coupling a second membrane to the first membrane so as to define gas-relief openings between the first and second membranes; placing the coupled first and second membranes over a body containing some liquid; and elevating the gas-relief openings over the body so that gas from the body is unobstructedly vented to atmosphere through at least one of the gas-relief openings. In another embodiment, the coupling the second membrane to the first membrane includes welding the second membrane to the first membrane. As used in this document, including the claims, welding one membrane to another membrane (or welding one thing to another) includes creating a continuous, elongated weld between the two, or creating one or more shorter welds between the two.

In another embodiment, the present invention is a method of venting gas from a body containing some liquid. The method includes placing a covering system over the body. The covering system includes a first membrane having an outer edge and a width and a first flotation member coupled to the first membrane. The first flotation member includes a first float and a first float compartment membrane. The first float has a width that is not more than twenty-five percent of the width of the first membrane and a first float compartment membrane, and the first float compartment membrane is coupled to the first membrane. The method also includes elevating portions of the first membrane above the body; and positioning the covering system to allow gas from the body to vent to atmosphere around the outer edge of the first membrane.

BRIEF DESCRIPTION OF THE DRAWINGS

The following drawings form part of the present specification and are included to further demonstrate certain aspects of the present covers and covering systems. The present covers, covering systems, and methods may be better understood by reference to one or more of these drawings in combination with the description of illustrative embodiments presented herein.

FIG. 8B depicts the portion of the embodiment shown in FIG. 8A, except the embodiment of the present flotation member takes the form of a single float.

FIG. 9A depicts a perspective view of a portion of one embodiment of the present covers and covering systems, which embodiment includes a service opening positioned within one of the present membranes and a service opening membrane coupled to the service opening edge that defines the service opening. The service opening edge is shown as being elevated via one of the present flotation members that takes the form of four floats, and multiple service opening weights coupled to the service opening membrane.

FIG. 13 depicts a perspective view of one of the present flotation members coupled to one of the present membranes with multiple spot welds.

DESCRIPTION OF ILLUSTRATIVE EMBODIMENTS

As a preliminary matter, it should be noted that in this document (including the claims), the terms "comprise" (and any form thereof, such as "comprises" and "comprising"), "have" (and any form thereof, such as "has" and "having"), and "include" (and any form thereof, such as "includes" and "including") are open-ended transitional terms. Thus, a thing (such as a covering system, a cover, or a venting method) that "comprises," "has," or "includes" one or more elements possesses those one or more elements, but is not limited to only possessing those one or more elements. For example, a covering system "comprising" a first membrane, a first flotation member, and a first plurality of gas-relief passageways is a system that has, but is not limited to only having, these items. In other words, the covering system possesses a first membrane, a first flotation member, and a first plurality of gas-relief passageways, but is not excluded from possessing additional elements or features that are not listed.

Figure 1:
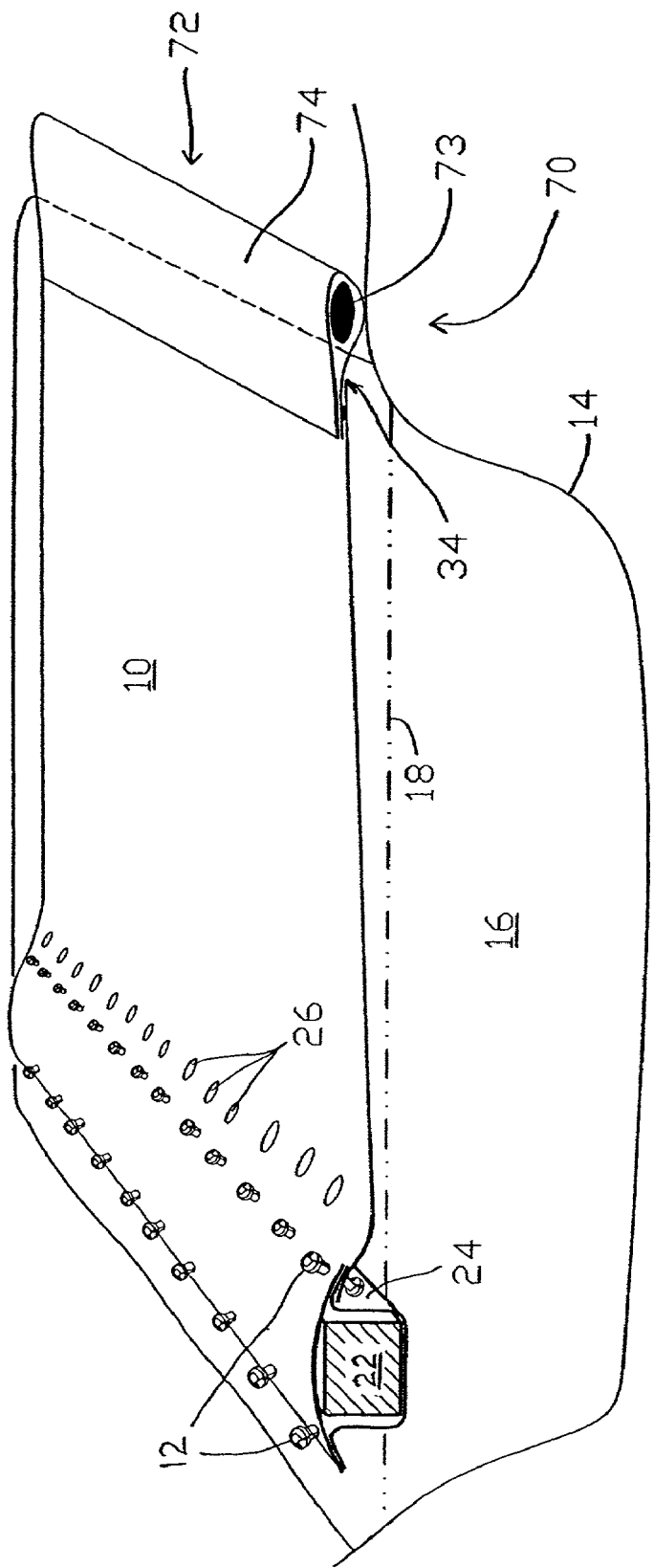
FIG. 1 is a perspective view of one embodiment of the present covers and covering systems that includes a flotation member coupled to a membrane with fasteners. Also shown are a plurality of gas-relief passageways.

FIG. 1 illustrates one embodiment of the present covers and covering systems. It shows membrane 10 (which may be characterized as a first membrane, a second membrane, etc., depending upon the context, as is true of all of the present membranes), and flotation member 20 coupled thereto. Flotation member 20 (which may be characterized as a first flotation member, a second flotation member, etc., depending upon the context, as is true of all of the present flotation members) includes float 22 (which may be characterized as a first float, a second float, etc., depending upon the context, as is true of all of the present floats), and float compartment membrane 24 (which may be characterized as a first float compartment membrane, a second float compartment membrane, etc., depending upon the context, as is true of all of the present float compartment membranes). While flotation member 20 is coupled to membrane 10, this arrangement may also be described by the fact that float compartment membrane 24 is coupled to membrane 10. As shown in FIG. 1, this coupling may take place through the use of fasteners 12. Fasteners 12 may be any suitable mechanical connector, such as nuts and bolts; rivets; latches; screws; plungers; clamps; various combinations of pins, collars, and nuts; and the like. Such mechanical connectors may be made from any suitable material, or combination of materials, including plastic and metal, such as stainless steel.

As shown in FIG. 1, the embodiment of the cover or covering system shown is positioned over a liquid-retaining structures, such as a pond, defined by bed 14 and filled with some liquid 16. The surface of the liquid is denoted as 18. One embodiment of an anchor system 70 is shown in FIG. 1. This embodiment of anchor system 70 includes weighted member 72 (which may be characterized as a first weighted member, a second weighted member, etc., depending upon the context, as is true of all of the present weighted members), which, in turn, includes weighted member membrane 74 (shown in the form of a tube and which may be characterized as a first weighted member membrane, a second weighted member membrane, etc., depending upon the context, as is true of all of the present weighted member membranes) and internal component 73 (which may be characterized as a first internal component, a second internal component, etc., depending upon the context, as is true of all of the present internal components). Anchor system 70 is coupled to edge 34 (which may be characterized as a first edge, a second edge, an inside edge, an outside edge, etc., depending on the context and particular application, as is true of all of the present membrane edges) of membrane 10 and, more specifically, weighted member membrane 74 is coupled to edge 34 of membrane 10. The coupling may be achieved using any suitable means, including one or more welds, or any of the fasteners mentioned above. The type of welds that may be used include those created through the use of hot air, a hot wedge, a hot liquid such as a plastic or plastic-like substance, through extrusion, through the use of a chemical (such as a solvent), through the use of radio frequency or ultra sonic means, or the like. All of the couplings described herein can be achieved using any of the permanent or non-permanent mechanisms disclosed above.

Also shown in FIG. 1 is a plurality of gas-relief passageways that include gas-relief passageways 26. The number of the present gas-relief passageways that may be included in a plurality of gas-relief passageways varies in number, and will depend upon the application. For example, a plurality of the present gas-relief passageways may include 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more, depending upon the application. The present gas-relief passageways may be formed within the present membranes or float compartment membranes using, for example, any suitable drilling techniques (such as with a drill), cutting tools (e.g., a knife), punches, scissors, presses, and the like. In addition, the edges of the gas-relief passageways may be reinforced if suited to the application using, for example, grommets, reinforcing patches or welding-like material that may be placed around all or part of the passageway, and the like.

As shown in FIG. 1, passageways 26 may be positioned within membrane 10 and adjacent to flotation member 20. Alternatively, these gas-relief passageways can be positioned within both flow compartment membrane 24 and membrane 10. The present gas-relief passageways can be structured so that gas rising above liquid 16 can flow unobstructed through the passageways when the embodiment shown in FIG. 1 is used. As used in this document, including the claims, a gas-relief passageway that is structured so that gas flows unobstructed through it when the cover or covering system of which it is a part is used means that the passageway is designed and created to be used without a fastener or other obstructing device within it. In addition to flowing through the gas-relief passageways, gas may also flow through the openings through which fasteners 12 are placed. This flow would not be unobstructed, however.

Figure 2:
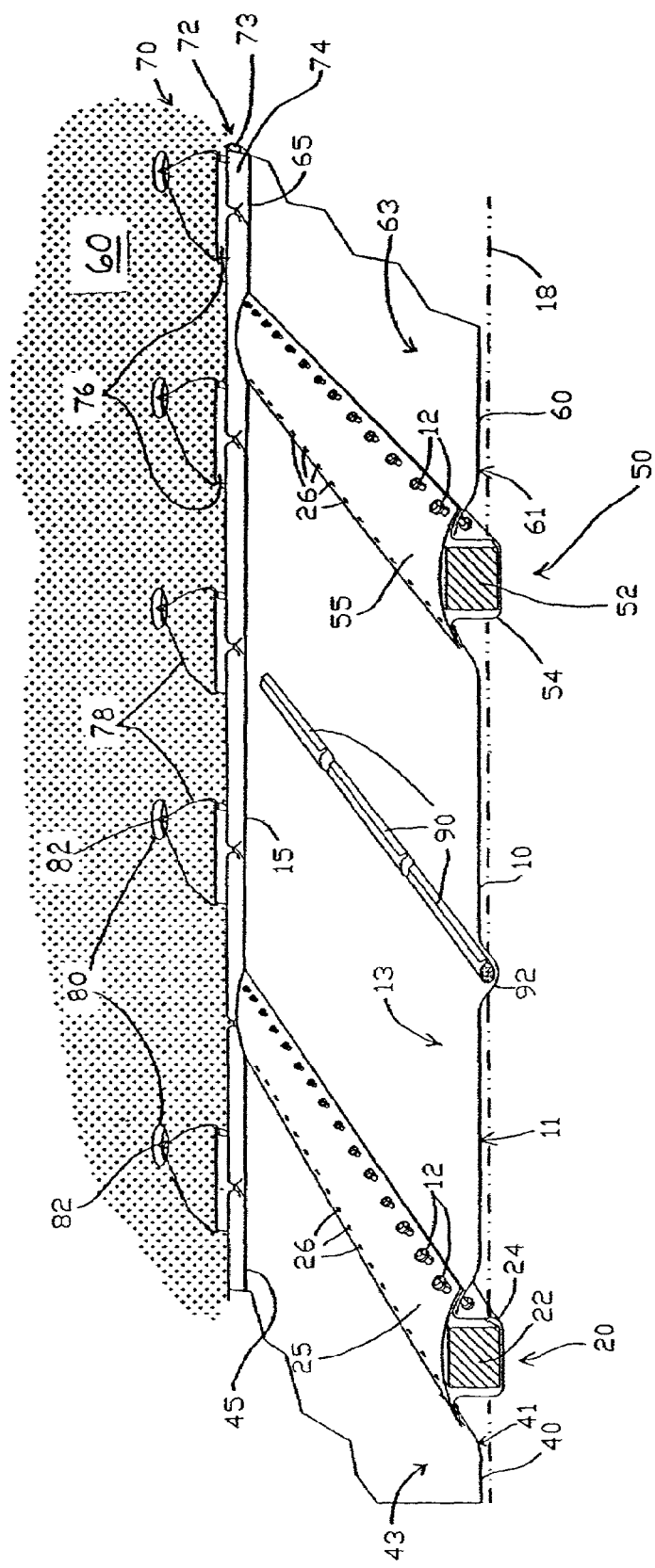
FIG. 2 is a perspective view of another embodiment of the present covers and covering systems that includes three membranes and two flotation members.

FIG. 2 is a perspective view of another embodiment of one of the present covers and covering systems. Like the embodiment shown in FIG. 1, the embodiment shown in FIG. 2 includes membrane 10 coupled to flotation member 20. In this embodiment, however, flotation member 20 includes not only float 22 and float compartment membrane 24, but also float compartment membrane 25. As shown, float compartment membrane 24 is coupled to upper surface 13 of membrane 10 rather than lower surface 11, and float compartment membrane 25 is coupled to float compartment membrane 24. Fasteners 12 are used to couple membrane 10, float compartment membrane 24, and float compartment membrane 25 as just described, and welds (not shown for simplicity) are used to couple membrane 40, float compartment membrane 24, and float compartment membrane 25. FIG. 2 also illustrates gas-relief passageways 26 positioned within float compartment membranes 24 and 25, and within membrane 10 on the opposite side of flotation member 20 from fasteners 12.

As shown in FIG. 2, spaced apart from flotation member 20 is flotation member 50, which includes float 52 and float compartment membranes 54 and 55. As shown, flotation member 50 is coupled to both membrane 10 and to membrane 60. More specifically, float compartment membrane 54 is coupled to upper surfaces 13 and 63 of membranes 10 and 60, respectively. Float compartment membrane 55 is coupled to float compartment membrane 54. Fasteners 12 and gas-relief passageways 26 are positioned within flotation member 50 in the same fashion as their position within flotation member 20.

FIG. 2 also shows anchor system 70, which, in one embodiment, includes weighted members 72. As shown in FIG. 2, a given weighted member can include internal component 73 and weighted member membrane 74. Internal component 73 may consist of sand, dirt, concrete, a slurry of any of these, or any other suitable material. One or more weighted members may make up a give anchor system, depending on the requirements of the application.

As shown in FIG. 2, anchor system 70 is coupled to edges 15, 45 and 65 of membranes 10, 40, and 60, respectively. More specifically, weighted members 72 are coupled to edges 15, 45 and 65 of membranes 10, 40, and 60, respectively. Even more specifically, weighted member membranes 74 are coupled to edges 15, 45 and 65 of membranes 10, 40, and 60, respectively. As used in this document, including the claims, a thing (such as an anchor system, a weighted member, a weighted member membrane, or the like) that is coupled to an edge of a membrane may be attached to the membrane either at the edge of the membrane or near the edge of the membrane.

Although shown in FIG. 2 as being coupled to the edges of all three membranes, those of skill in the art having the benefit of this disclosure will understand that anchor system 70 may be coupled to only one of membranes 10, 40 and 60 or to any combination of the membranes that is fewer than all of them. Thus, an anchor system consistent with this disclosure may be adapted to suit the particular application. Similarly, although shown in FIG. 2 as including seven weighted members 72, those of skill in the art having the benefit of this disclosure will understand that as few as one weighted member 72 may be a part of an anchoring system coupled to one of the present covers or covering systems, and alternatively, as many weighted members as are necessary for the application may be used.

In another embodiment, which is also shown in FIG. 2, anchor system 70 may include one or more connectors 76 (which, individually, may be characterized as a first connector, a second connector, etc., depending upon the context, as is true of all of the present connectors), which, as shown in FIG. 2, may take the form of sleeves (which may be characterized as a first sleeve, a second sleeve, etc., depending upon the context, as is true of all of the present sleeves). Connectors 76 (which are only partially visible in FIG. 2) are shown in FIG. 2 as being coupled to edges 15, 45, and 65. Connectors 76 may also take the form pipes, such as those made of plastic or metal. Although five connectors 76 are shown in FIG. 2, those of skill in the art having the benefit of this disclosure will understand that as few as one connector or as many as are needed for a particular application may be coupled to one or more of edges 15, 45, and 65. In one embodiment, anchoring cables 78 (which, individually, may be characterized as a first anchoring cable, a second anchoring cable, etc., depending upon the context, as is true of all of the present anchoring cables) may be placed through connectors 76 and used to secure connectors 76, and thus the embodiment of the present covers and covering systems shown in FIG. 2, to bank 60. More specifically, one or more anchoring holes 80 (which, individually, may be characterized as a first anchoring hole, a second anchoring hole, etc., depending upon the context, as is true of all of the present anchoring holes) may be created in bank 60, into which one or more anchoring stakes 82 (which, individually, may be characterized as a first anchoring stake, a second anchoring stake, etc., depending upon the context, as is true of all of the present anchoring stakes) may be placed and anchored in cement. As shown in FIG. 2, an anchoring cable 78 may be coupled to an anchoring stake 82 in order to secure the embodiment of the present covers and covering systems.

As an alternative to anchor system 70, and as is known in the art, an anchor trench may be used as a means of securing one of the present covers or covering systems to a bank. That is, a trench that may be any suitable distance from the liquid surface may be dug, the edge or edges of the membrane or membranes being used may be placed in the trench, and the trench may be backfilled with earth, concrete, or the like. The trench may be any width and depth suited to the application, such as being two feet wide by two feet deep. The trench may also extend along the bank any suitable distance. It will be understood that alternatively, an embodiment of the present anchor systems 70 that includes weighted members 72, but not connectors 76, may be used in combination with an anchor trench to achieve suitable anchoring of the cover or covering system to a bank or other earthen structure.

As another alternative to anchor system 70, batten bars may be used to anchor one of the present covers or covering systems to a bank or other structure. The use of batten bars, as those of skill in the art will understand, would involve effectively pinching one or more of the present membranes between one or more batten bars, and an underlying substrate, such as concrete.

Elongated weights may also be used in conjunction with the present covers and covering systems to control rainwater drainage and collection. For example, one or more elongated weights 90 (which, individually, may be characterized as a first elongated weight, a second elongated weight, etc., depending upon the context, as is true of all of the present elongated weights) may form part of the embodiment of the present covers and covering systems shown in FIG. 2. Elongated weights 90 are positioned on upper surface 13 of membrane 10, and between flotation members 20 and 50. These elongated weights, which, for example, may take the form of tubes filled with sand, earth, etc., or any other suitable mass (even pipes made of suitably heavy plastic, metal, or concrete), are useful in creating channels (such as channel 92 shown in FIG. 2) within which rainwater or any other liquid resting on upper surface 13 of membrane 10 may flow. Pumps or other mechanisms may be used to siphon off water collected as the result of using such channels.

In use, the bottoms of flotation members 20 and 50 depicted in FIG. 2 will rest beneath liquid surface 18. The same thing will happen to the portion of membrane 10 beneath elongated weights 90. Because the portion of membrane 10 located beneath elongated weights 90 will be pushed beneath liquid surface 18 in use, any gas that collects beneath the embodiment of the present covers and covering systems shown in FIG. 2 will migrate toward flotation members 20 and 50. Furthermore, because the bottoms of flotation members 20 and 50 will be positioned beneath liquid surface 18, that gas will have no place to go but up through either gas-relief passageways 26, or up through the openings through which fasteners 26 are placed.

Membranes, such as membranes 10, 40, and 60 shown in FIG. 2, may be coupled together in any number and fashion best-suited to a particular application. Accordingly, the membranes may take on any suitable shape, including rectangular, triangular, round, hemispherical, etc., depending on the shape of the liquid-retaining structure being covered. The disclosed membranes, as well as the disclosed float compartment membranes, may be formed from any suitable material, including Hypolon, polyvinyl chloride (PVC), polypropylene, XR-5, high density polyethylene, plastic, geomembrane, geotextile. In addition, if properly treated, certain types of cloth, canvas, or paper also may be used. These same materials may be used for the disclosed weighted member membranes and connectors. The disclosed floats may be formed from any suitable material, including foam, insulation, paper, plastic, an air- or gas-filled bladder (such as an inflated tube or bubble wrap), expanded or extruded polystyrene foam, polypropylene foam, polyethylene foam, and the like. These materials may be formed to size, or cut to size using, for example, any of the tools discussed above for use in forming gas-relief passageways 26.

Figure 3:
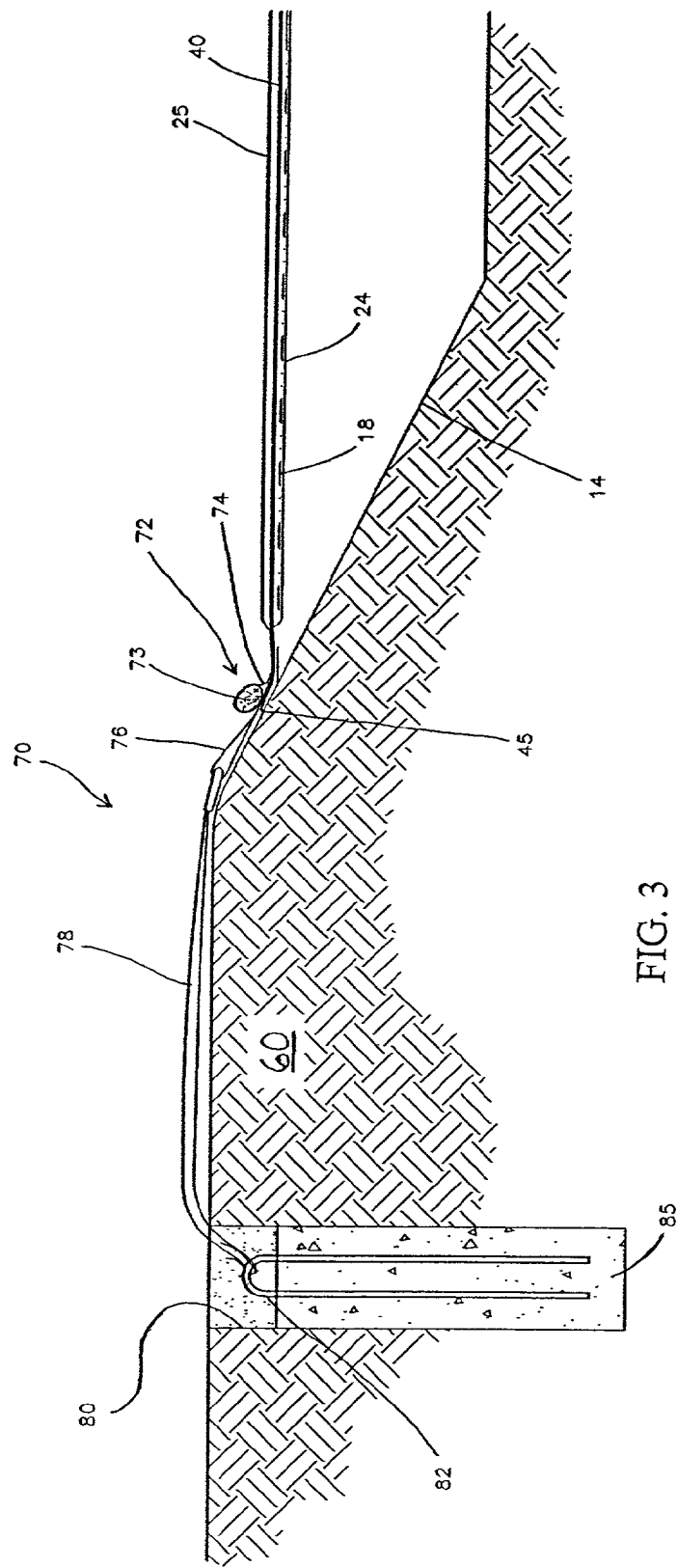
FIG. 3 is a side view (showing certain aspects in cross-section) of one embodiment of an anchor system coupled to one embodiment of the present covers and covering systems.

FIG. 3 is an elevational view of showing anchor system 70 coupled to edge 45 of membrane 40 (which is shown in FIG. 2). Specifically, FIG. 3 illustrates weighted member 72, and more specifically weighted member membrane 74, coupled to edge 45 of membrane 40. This coupling may occur through the use of any of the mechanisms described herein, including welds, fasteners, and the like. FIG. 3 also illustrates connector 70 being coupled to edge 45 of membrane. This coupling may also occur through the use of any of the mechanisms described herein, including welds, fasteners, and the like. FIG. 3 shows hole 80, or earth anchors (earth screws) which may be dug to any suitable level (e.g., from one to ten feet), into which anchoring stake 82 has placed and anchored in concrete 85 (or any other suitable material).

FIGS. 4A-G, 5A-G, and 12A-C illustrate various embodiments of the manner in which the present flotation members can be coupled to the present membranes. More specifically, these figures illustrate various embodiments of how the present membranes and the present float compartment membranes may be coupled together using different attachment mechanisms. Although welds, fasteners, flotation member straps, and flotation member ties are the attachment mechanisms disclosed in these figures, other attachment mechanisms, such as those disclosed herein, may be used if appropriate for a given application.

Figure 4A:
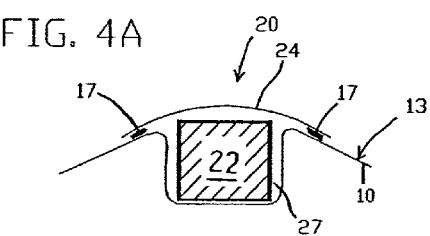
FIGS. 4A-G illustrate various embodiments of the manner in which the present flotation members can be coupled to the present membranes through the use of welding.
Figure 5D:
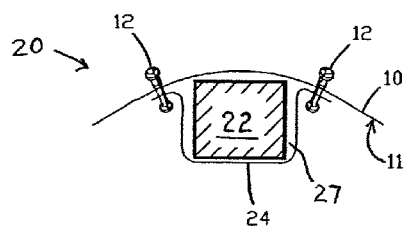
FIGS. 5A-G illustrate various embodiments of the manner in which the present flotation members can be coupled to the present membranes through the use of fasteners.
Figure 5A:
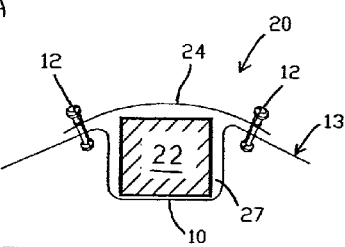

FIGS. 4A and 5A illustrate flotation member 20 coupled to membrane 10. Flotation member 20 includes float 22 and float compartment membrane 24. As shown in both figures, float 22 is positioned between float compartment membrane 24 and membrane 10. In both figures, float compartment membrane 24 is coupled to upper surface 13 of membrane 10. FIG. 4A shows that the coupling may be achieved through the use of welds 17, and FIG. 5A shows that the coupling may be achieved through the use of fasteners 12. In both figures, membrane 10 and float compartment membrane 24 form float compartment 27. This float compartment can be sealed using any suitable mean, including, for example, welds 17 as shown in FIG. 4A. As used in this document, including the claims, an enclosure that is sealed is one that is airtight and/or watertight. Thus, a float that is sealed within a membrane of some sort, or within an enclosure (such as a float compartment) would be free from water or air penetrating the sealed environment. Those of skill in the art will understand, however, that even sealed enclosures as described herein may, over the course of normal wear and tear, be penetrated by air or water, as it would be virtually impossible to ensure otherwise.

Figure 4D:
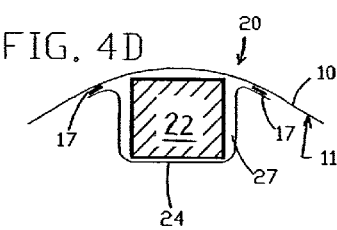
Figure 4B:
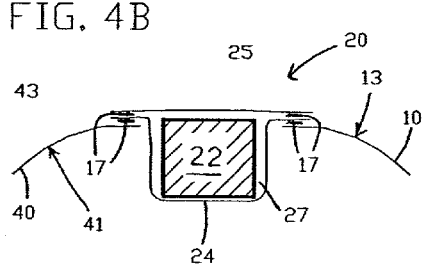
Figure 5G:
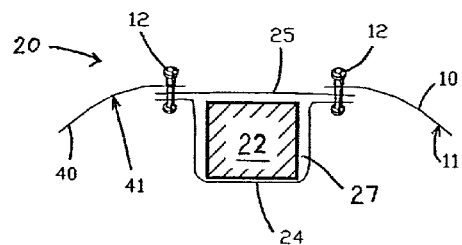
Figure 5B:
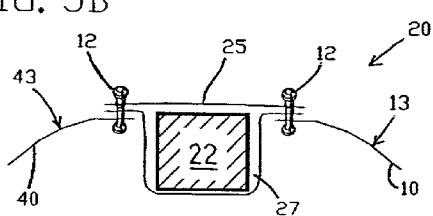

FIGS. 4B and 5B illustrate flotation member 20 coupled to membranes 10 and 40. In both figures, flotation member 20 includes float 22 and float compartment membranes 24 and 25. As shown in both figures, float 22 is positioned between float compartment membranes 24 and 25. In both figures, float compartment membrane 24 is coupled to upper surface 13 of membrane 10 and to upper surface 43 of membrane 40, which is shown as also having lower surface 41. In both figures, float compartment membrane 25 is coupled to float compartment membrane 24. FIG. 4B shows that the above-described coupling may be achieved through the use of welds 17, and FIG. 5B shows that the above-described coupling may be achieved through the use of fasteners 12. In both figures, float compartment membranes 24 and 25 form float compartment 27. This float compartment can be sealed using any suitable mean, including, for example, welds 17 as shown in FIG. 4B.

Figure 4E:
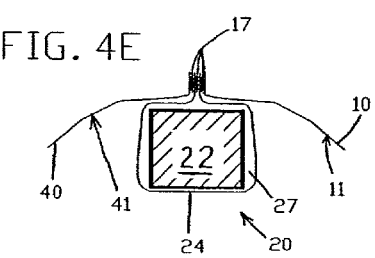
Figure 4C:
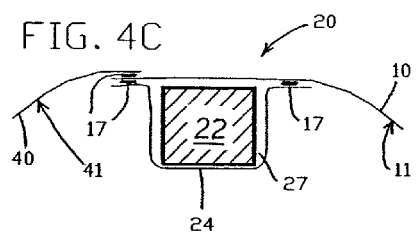
Figure 5F:
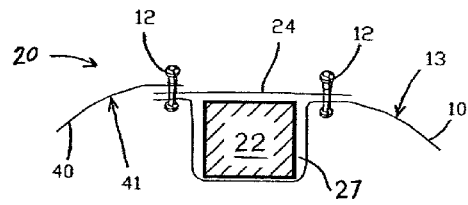
Figure 5C:
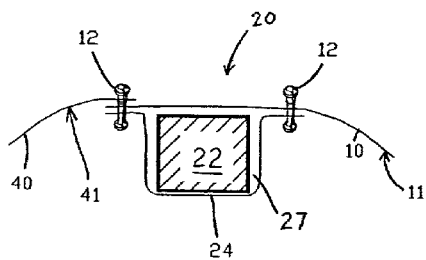

FIGS. 4C and 5C illustrate flotation member 20 coupled to membrane 10. Flotation member 20 includes float 22 and float compartment membrane 24. As shown in both figures, float 22 is positioned between float compartment membrane 24 and membrane 10. In both figures, float compartment membrane 24 is coupled to lower surfaces 11 (in two locations) and 41 of membranes 10 and 40, respectively. FIG. 4C shows that the coupling may be achieved through the use of welds 17, and FIG. 5C shows that the coupling may be achieved through the use of fasteners 12. In both figures, membrane 10 and float compartment membrane 24 form float compartment 27. This float compartment can be sealed using any suitable mean, including, for example, welds 17 as shown in FIG. 4C.

FIGS. 4D and 5D illustrate flotation member 20 coupled to membrane 10. Flotation member 20 includes float 22 and float compartment membrane 24. As shown in both figures, float 22 is positioned between float compartment membrane 24 and membrane 10. In both figures, float compartment membrane 24 is coupled to lower surface 11 of membrane 10. FIG. 4D shows that the coupling may be achieved through the use of welds 17, and FIG. 5D shows that the coupling may be achieved through the use of fasteners 12. In both figures, membrane 10 and float compartment membrane 24 form float compartment 27. This float compartment can be sealed using any suitable mean, including, for example, welds 17 as shown in FIG. 4D.

Figure 5E:
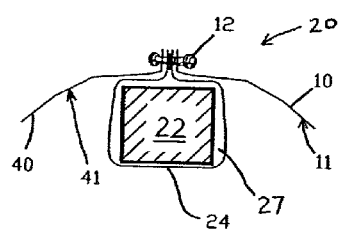

FIGS. 4E and 5E illustrate flotation member 20 coupled to membrane 10. Flotation member 20 includes float 22 and float compartment membrane 24. In both figures, float compartment membrane 24 is coupled to lower surfaces 11 and 41 of membranes 10 and 40, respectively. FIG. 4E shows that the coupling may be achieved through the use of welds 17, and FIG. 5E shows that the coupling may be achieved through the use of fastener 12. In both figures, float compartment membrane 24 forms float compartment 27. This float compartment can be sealed using any suitable mean, including, for example, one or more welds 17 as shown in FIG. 4E.

Figure 4F:
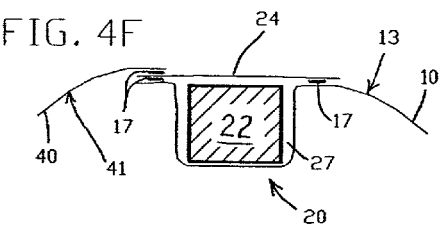

FIGS. 4F and 5F illustrate flotation member 20 coupled to membrane 10. Flotation member 20 includes float 22 and float compartment membrane 24. As shown in both figures, float 22 is positioned between float compartment membrane 24 and membrane 10. In both figures, float compartment membrane 24 is coupled to upper surfaces 13 (in two locations) and lower surface 41 of membranes 10 and 40, respectively. FIG. 4F shows that the coupling may be achieved through the use of welds 17, and FIG. 5F shows that the coupling may be achieved through the use of fasteners 12. In both figures, membrane 10 and float compartment membrane 24 form float compartment 27. This float compartment can be sealed using any suitable mean, including, for example, welds 17 as shown in FIG. 4F.

Figure 4G:
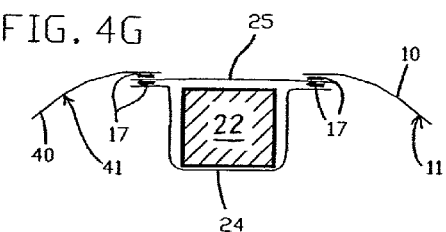

FIGS. 4G and 5G illustrate flotation member 20 coupled to membranes 10 and 40. In both figures, flotation member 20 includes float 22 and float compartment membranes 24 and 25. As shown in both figures, float 22 is positioned between float compartment membranes 24 and 25. In both figures, float compartment membrane 25 is coupled to lower surfaces 11 and 41 of membranes 10 and 40, respectively. In both figures, float compartment membrane 24 is coupled to float compartment membrane 25. FIG. 4G shows that the above-described coupling may be achieved through the use of welds 17, and FIG. 5G shows that the above-described coupling may be achieved through the use of fasteners 12. In both figures, float compartment membranes 24 and 25 form float compartment 27. This float compartment can be sealed using any suitable mean, including, for example, welds 17 as shown in FIG. 4G.

Although FIGS. 4A-G and 5A-G illustrate the use of either fasteners 12 or welds 17 for coupling the present flotation members to the present membranes, it will be understood that fasteners and welds may be intermixed such that welds are used on one side of a given flotation member and fasteners on the other, or both welds and fasteners are used on the same side in an alternating or random fashion.

Figure 12A:
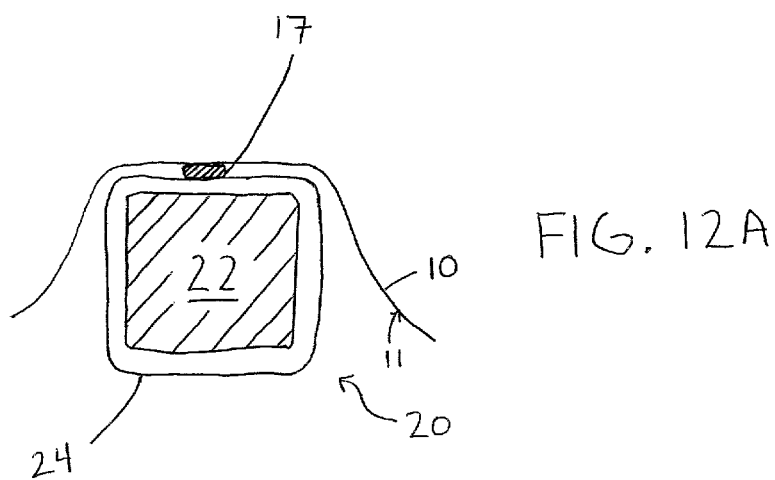
FIGS. 12A-C illustrate various embodiments, in addition to those depicted in FIGS. 4A-G and FIGS. 5A-G of the manner in which the present flotation members can be coupled to the present membranes.

FIG. 12A illustrates flotation member 20 coupled to membrane 10 with weld 17, which may be a continuous and elongated and span the length of much of flotation member 20. Alternatively, multiple spot welds 17 may be used in place of a continuous, elongated weld. As shown in FIG. 12A, flotation member 20 includes float 22 and float compartment membrane 24. In this embodiment, float 22 is sealed within float compartment membrane 24. Further, float compartment membrane 24 and, thus, flotation member 20, is coupled to lower surface 11 of membrane 10. FIG. 13 illustrates a perspective view of the configuration depicted in FIG. 12A, and includes two pluralities of gas-relief passageways 26, both pluralities being positioned within membrane 10 and being adjacent to flotation member 20 on alternate sides thereof.

Figure 12B:
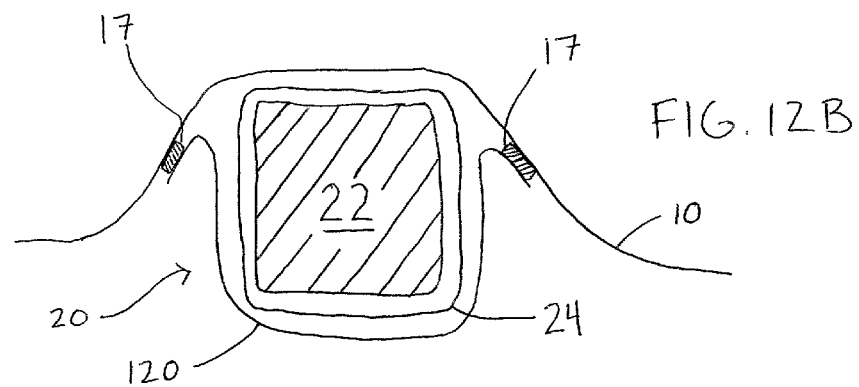

FIG. 12B illustrates flotation member 20 coupled to membrane 10 with at least one flotation member strap 120. More specifically, FIG. 12B illustrates an embodiment in which flotation member 20 is coupled to membrane 10 with at least one flotation member strap 120 that is secured to lower surface 11 of membrane 10 with welds 17. The present flotation member straps may be made from any of the materials disclosed herein that may be used for the present membranes or the present float compartment membranes. Multiple flotation member straps may be used, depending on the length of flotation member 20 and any other relevant factors. As an alternative to welds 17, fasteners may be used to secure flotation member strap 120 to membrane 10. As with all of the present embodiments involving welds 17, the welds may be spot welds or elongated, continuous welds. As shown in FIG. 12B, flotation member 20 includes float 22 and float compartment membrane 24. In this embodiment, float 22 is sealed within float compartment membrane 24.

Figure 12C:
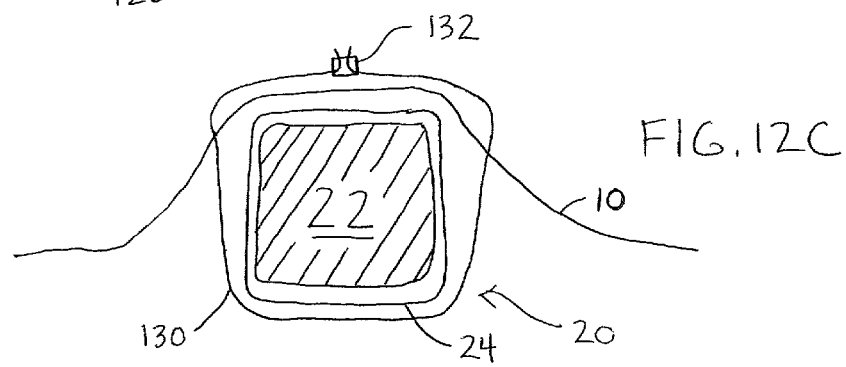

FIG. 12C illustrates flotation member 20 coupled to membrane 10 with at least one flotation member tie 130. Membrane 10 may be configured, or provided, with tie openings (not shown for simplicity) through which flotation member tie 130 can extend. In addition, multiple flotation member ties may be used, depending on the length of flotation member 20 and any other relevant factors. The ends of flotation member tie 130 may be secured with securing element 132. The present flotation member ties may be cables, ropes, straps made of any of the materials disclosed herein for use as the present membranes and float compartment membranes, cable ties, etc. Depending on what flotation member tie 130 is made of, securing element 132 may be a knot, a clamping device, a crimped piece of metal, a piece of heat-shrink tubing, or any other device that is suited to securing two ends together.

Figure 6:
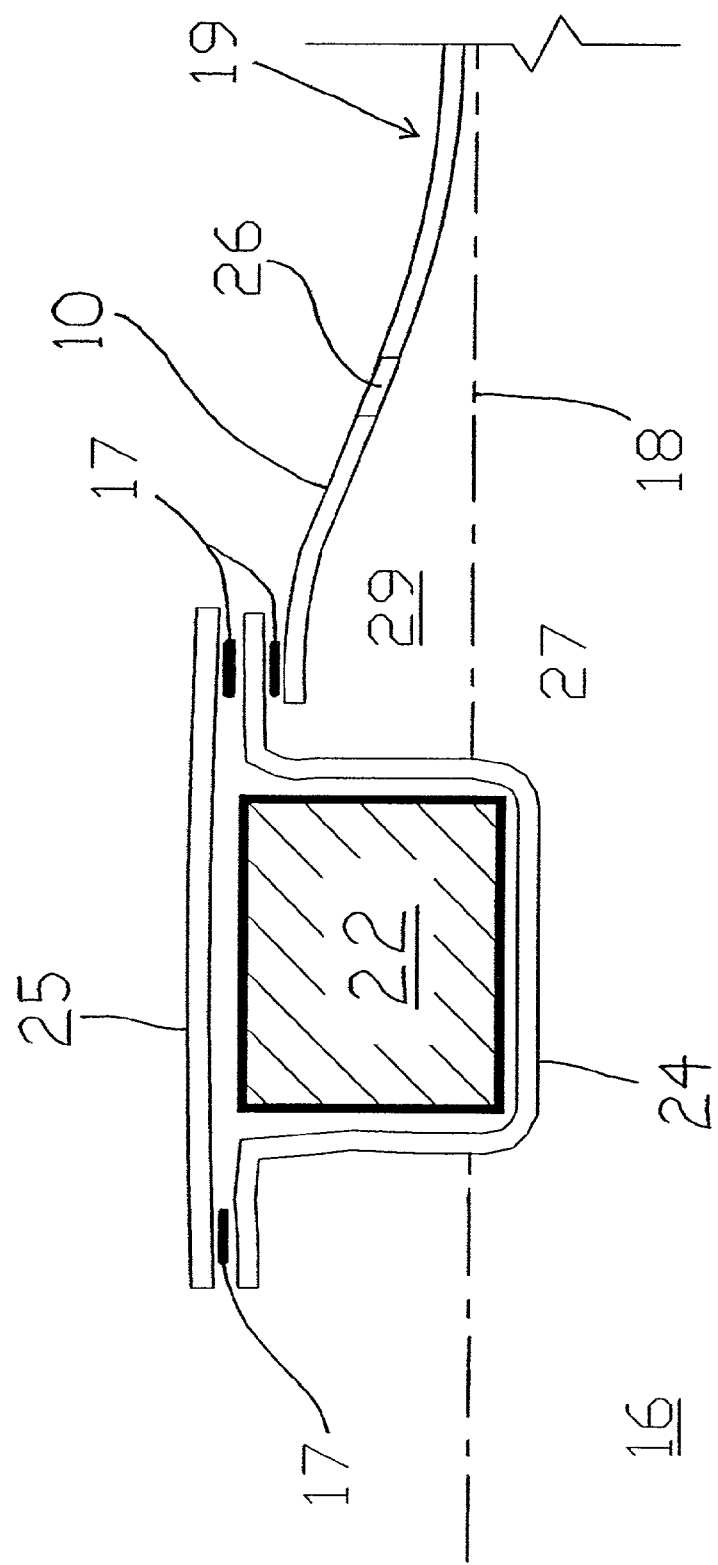
FIG. 6 depicts an enlarged, close-up view (showing certain aspects in cross-section) of a portion of one embodiment of the present covers and covering systems that illustrates that gas that collects in a gas pocket may pass through one of the present gas-relief passageways.

FIG. 6 illustrates a close-up cross-sectional view of the position of gas-relief passageway 26 (which may be part of a plurality of gas-relief passageways not shown) in relation to other portions of membrane 10. FIG. 6 illustrates that by coupling membrane 10 to float compartment membrane 24 in the manner shown, gas pocket 29 is created when the illustrated embodiment of the present covers and covering systems is used. Gas may collect within gas pocket 29. Because gas-relief passageway 26 is positioned within membrane 10 at a location that is above at least a portion 19 of membrane 10 when the embodiment shown is in use, any gas from the covered body (note liquid surface 18) that collects above liquid surface 18 and within gas pocket 29 is allowed to flow unobstructed through gas-relief passageway 26.

Figure 7:
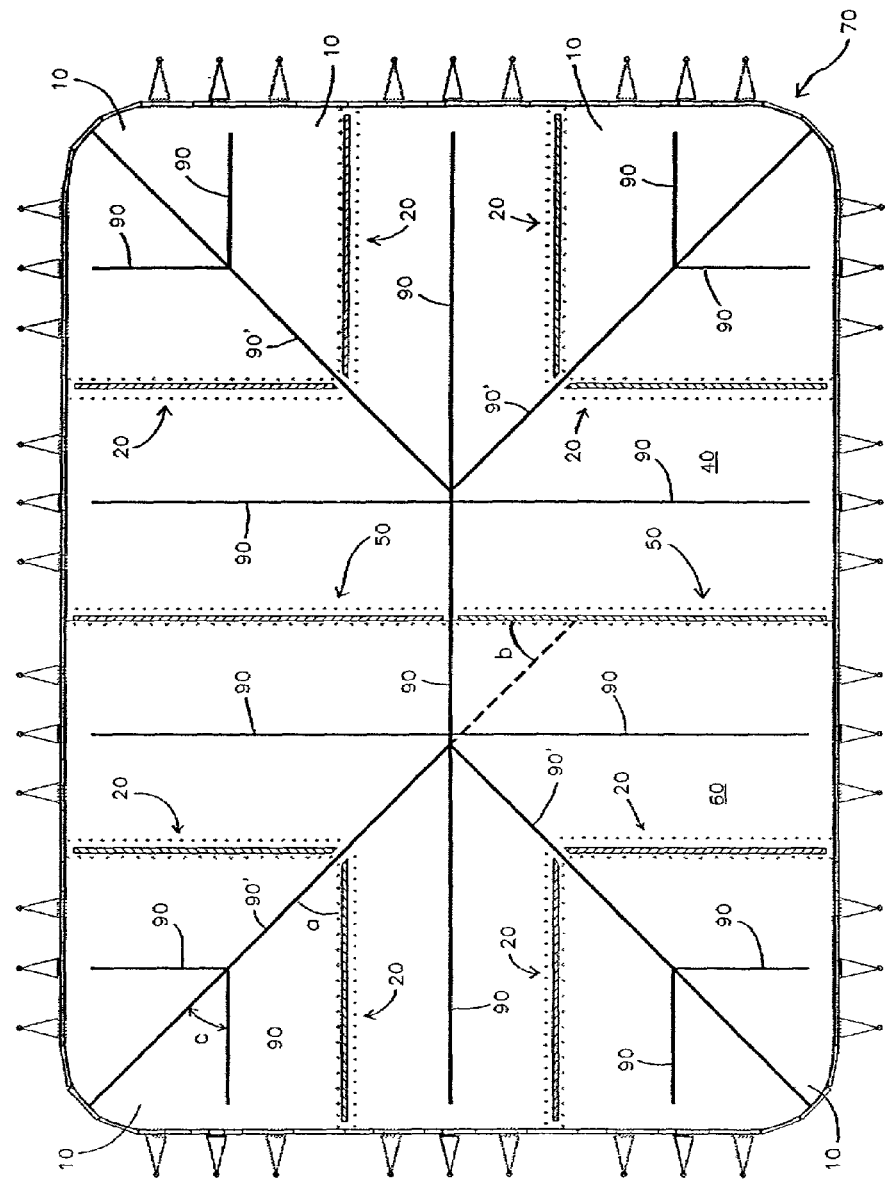
FIG. 7 depicts a top view of one embodiment of the present covers and covering systems that illustrates multiple membranes and multiple flotation members coupled together to cover a rectangular area.

FIG. 7 shows a top view of one embodiment of the present covers and covering systems. In this embodiment, four membranes 10 are shown, each of which is attached to either a T-shaped membrane 60 or a T-shaped membrane 40. Also shown are elongated weights 90 and 90' (pronounced "ninety prime") positioned on the upper surfaces (unnumbered for simplicity) of each of the membranes shown. Elongated weights 90' are positioned on the upper surfaces of the membranes at angle c to elongated weights 90, at angle b to flotation members 50, and at angle a to flotation members 20. The present elongated weights may be positioned at any angle with respect to other elongated weights and/or flotation members that is suited for a given application. The float compartment membranes, the gas-relief openings, and the fasteners shown in FIG. 7 are not numbered for simplicity and ease-of-viewing. The same is true for the details of the anchor system 70 coupled to the outside edges of the membranes.

Figure 8A:
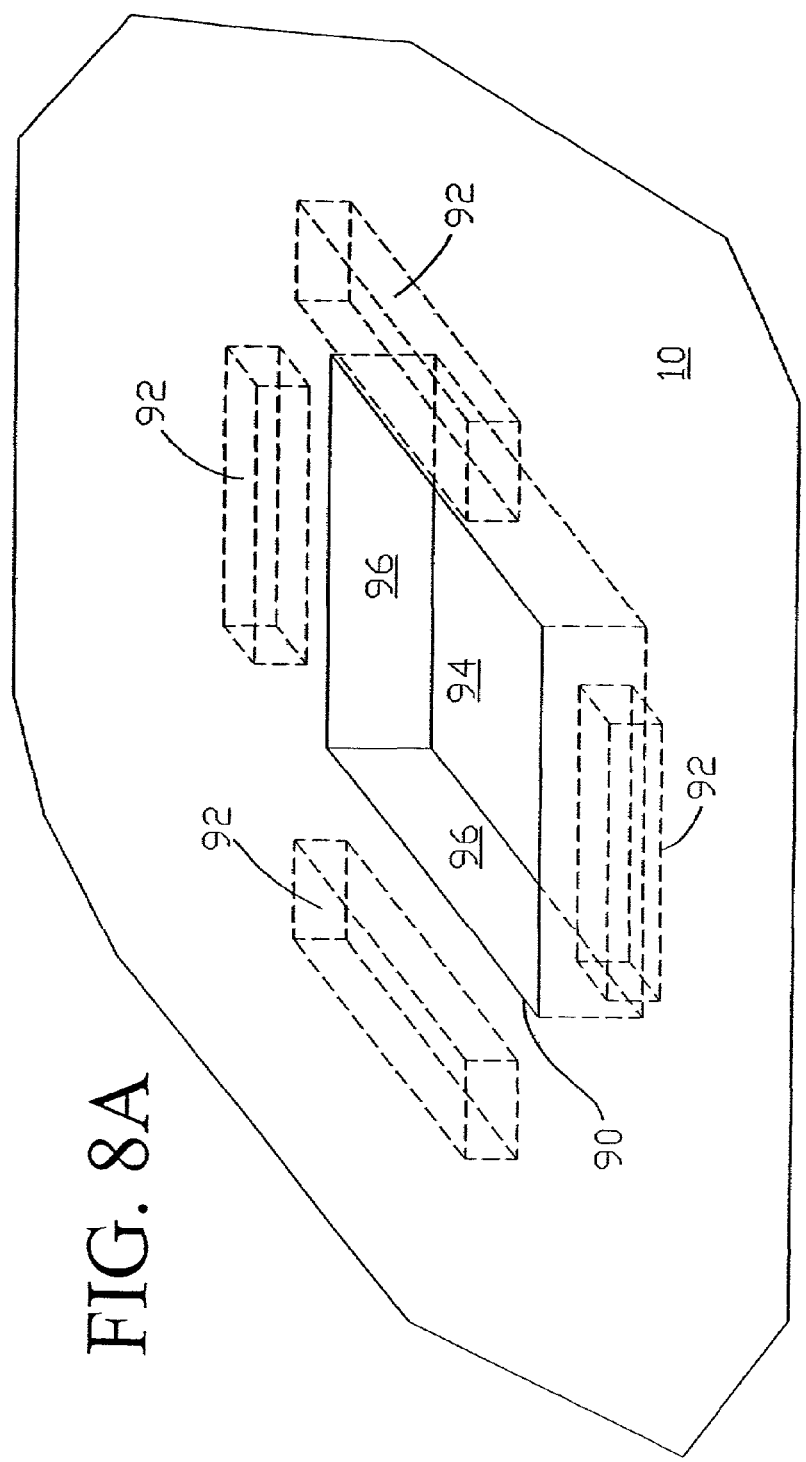
FIG. 8A depicts a perspective view of a portion of one embodiment of the present covers and covering systems, which embodiment includes a service opening positioned within one of the present membranes and a service opening membrane coupled to the service opening edge that defines the service opening. The service opening edge is shown as being elevated via one of the present flotation members that takes the form of four floats.

FIGS. 8A and B and FIGS. 9A and B illustrate that the present membranes may be provided with service openings at any suitable location within the membrane. This facilitates the ability of operators or users of the present covers and covering systems to place the cover or covering system over equipment that already exists. It also allows workers to introduce new equipment to the liquid-retaining structure through the service opening. The service openings discussed herein may be positioned anywhere within the present membranes that is suited to the application. For example, placing one of the present service openings near one of the present flotation members may facilitate the ability of workers to walk on and work from the flotation member when introducing new equipment through the service opening or servicing existing equipment positioned within the service opening.

FIG. 8A illustrates a partial view of one embodiment of the present covers and covering systems that includes membrane 10 and service opening 94 (which may be characterized as a first service opening, a second service opening, etc., depending upon the context, as is true of all of the present service openings) positioned within membrane 10. Service opening 94 is defined by service opening edge 90 that is, although not shown, spaced apart from any flotation members, and pluralities of openings that may also characterize the illustrated embodiment. A flotation member in the form of floats 92 is coupled to membrane 10 (specifically, to the lower surface of membrane 10 as evidenced by the dashed lines outlining floats 92) so as to elevate service opening edge 90 above the surface of the body containing some liquid (not shown) over which membrane 10 is positioned. That is, floats 92 are coupled to the lower surface of membrane 10 so as to elevate service opening edge 90 above the surface of the body containing some liquid when the embodiment of the present covers and covering systems is used. Service opening membrane 96 (which may be characterized as a first service opening membrane, a second service opening membrane, etc., depending upon the context, as is true of all of the present service opening membranes) is coupled to service opening edge 90. In one embodiment, service opening membrane 96 may include multiple pieces of material affixed along different portions of service opening edge 90 and to each other. In another embodiment, service opening membrane 96 may include a single piece of material. Floats 92 may be configured in the same way. That is, one or more floats 92 may be used to form the flotation member that is coupled to the lower surface of membrane 10 so as to elevate service opening edge 90 above the surface of the body containing some liquid when the particular cover or covering system is in use. Alternatively, a single float 92 (which would make up one of the present flotation members) may be used, as shown in FIG. 8B.

Using a service opening membrane in the way depicted in FIGS. 8A and B will prevent liquid from the body, or liquid-retaining structure, over which the particular cover or covering system is placed from finding its way to the upper surface(s) of the present membranes. This follows because the present service opening membranes (which may be formed from any of the same materials as the present membranes, and which may be coupled to the present service opening edges in any suitable fashion, such as using welds or any other suitable means discussed herein) can be dimensioned so as to dip into the liquid being covered. Adding to this the fact that a flotation member (such as the one shown in FIG. 8A in the form of floats 92) may be used to elevate any of the present service opening edges above the body it covers, the likelihood of liquid from the body getting onto the upper surfaces of the present membranes is minimized.

Figure 9B:
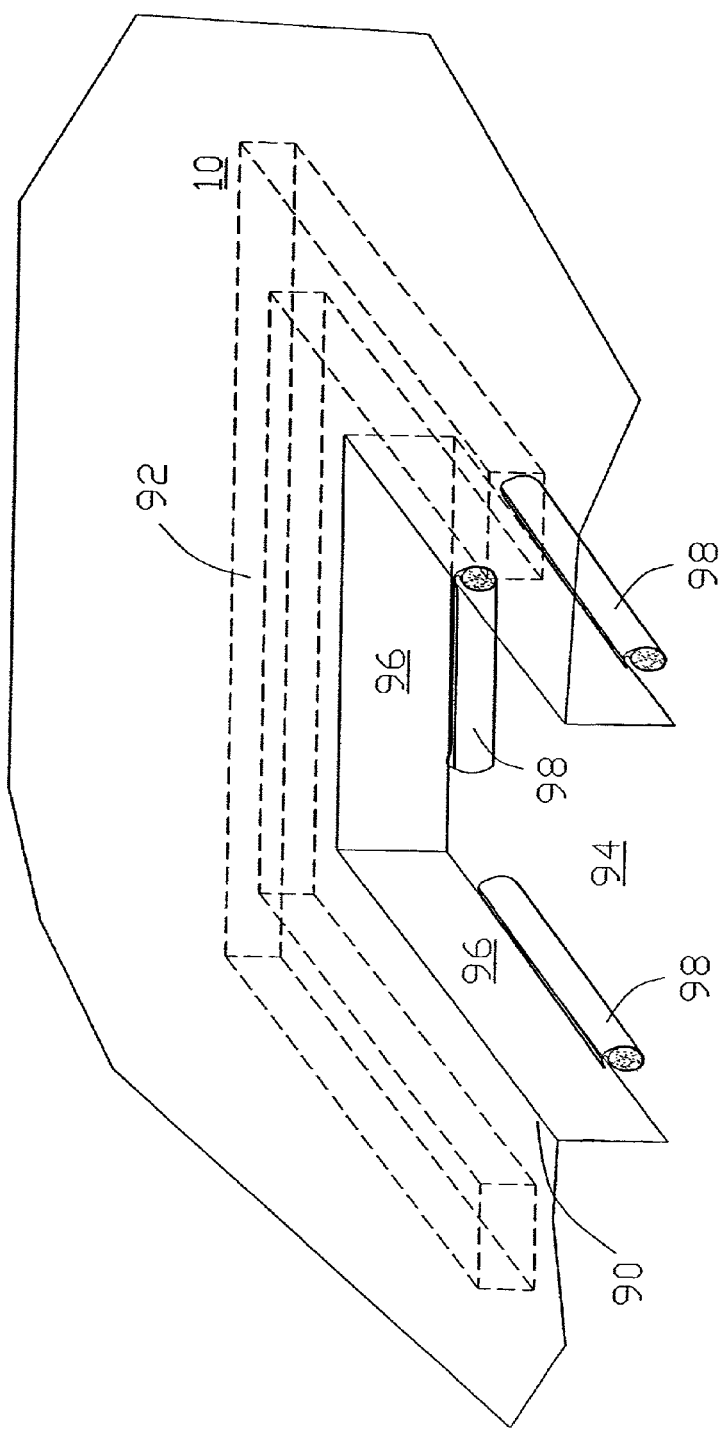
FIG. 9B depicts the portion of the embodiment shown in FIG. 9A, except the embodiment of the present flotation member takes the form of a single float.

FIG. 9A shows that multiple service opening weights 98 (which, individually, may be characterized as a first service opening weight, a second service opening weight, etc., depending upon the context, as is true of all of the present service opening weights) may be coupled to service opening membrane 96 (the weights are used to sink the service opening membrane) and spaced apart from service opening edge 90. Such weights may be useful in minimizing the effects of wind on the present covers and covering systems. As shown in FIG. 9B, a single float 92 (which would make up one of the present flotation members) may be used in placed of multiple floats 92 shown in FIG. 9A.

The present methods, in addition to including venting methods, include methods for creating a service opening in a liquid-retaining structure cover or covering system. The benefits that can be realized from providing the present service openings in the present covers and covering systems may also be realized by creating, or providing, the present service openings in existing liquid-retaining structure covers. Thus, a method of accomplishing this includes cutting the service opening in the cover, the service opening being defined by a service opening edge. The method, in one embodiment, also includes reinforcing the service opening edge. The reinforcing may include attaching a reinforcing material to the service opening edge. The reinforcing material may be made from any suitable material, including any of those described herein for use as the present membranes. The attaching may include welding or applying an adhesive. In one embodiment, the method can include coupling one of the present flotation members to the lower surface of the cover around the service opening edge. In another embodiment, the method includes coupling a service opening membrane to the service opening edge, either before or after reinforcing the service opening edge, or in lieu of reinforcing the service opening edge. In another embodiment, one or more service opening weights may be coupled to a service opening membrane that is coupled to the service opening edge. The service opening edge may be configured to be of any suitable size, including any dimension within the range of 1 square foot to 500 square feet, depending upon the application. For example, if a large piece of equipment needed to be installed in the liquid-retaining structure beneath an existing cover, but it is impractical for whatever reason to remove or lift the cover in order to effect the installation, one of the present service openings could be provided in the existing cover using this method to permit that installation. The service opening could be sized to fit the piece of equipment in need of installation.

Figure 10:
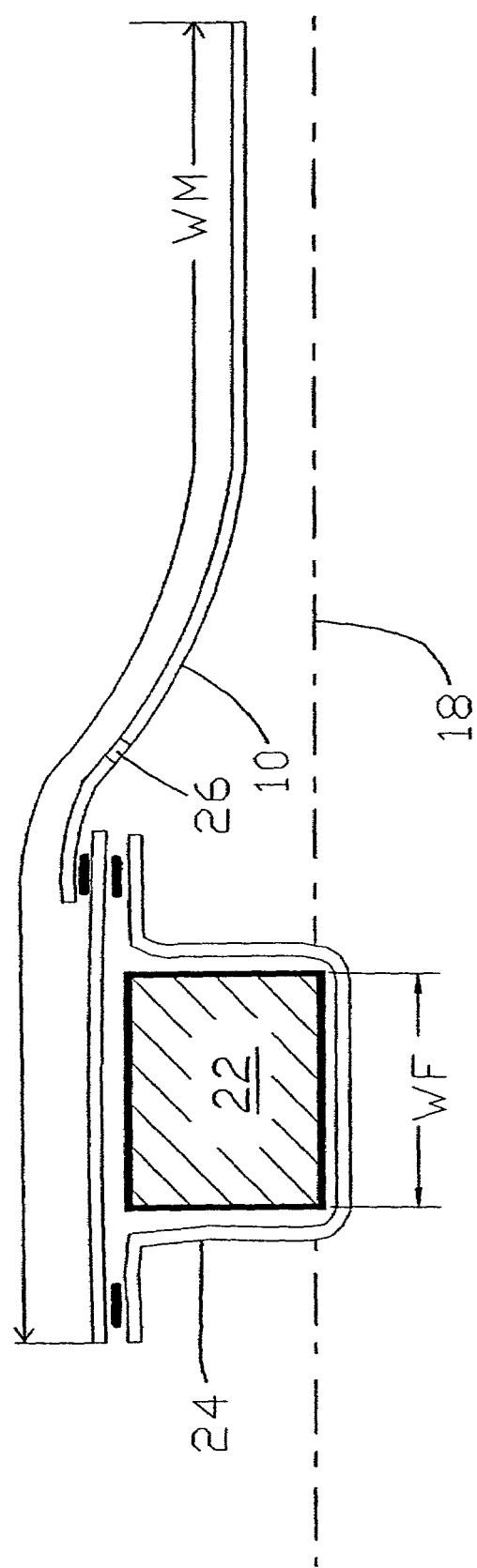
FIG. 10 depicts a view similar to the one shown in FIG. 6, and illustrates the width WF of one of the present floats and the width WM of one of the present membranes.

One of the advantages of present covers and covering systems is their cost-effectiveness. The present floats may have widths that are substantially less that the widths of the present membranes. This can reduce costs over systems such as those shown in U.S. Pat. Nos. 5,400,549 and 5,562,759, which include modules with insulative enclosures that span nearly the entire width of the enclosing membranes. FIG. 10 shows membrane 10 as having width WM. FIG. 10 also shows float 22 as having width WF. Width WF may be any percentage of width WM that is suited for the application. For example, width WF may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 percent of width WM. Similarly, width WF may be not more 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 percent of width WM. Any of the present float and membrane combinations described herein may have these relationships in terms of widths.

Figure 11:
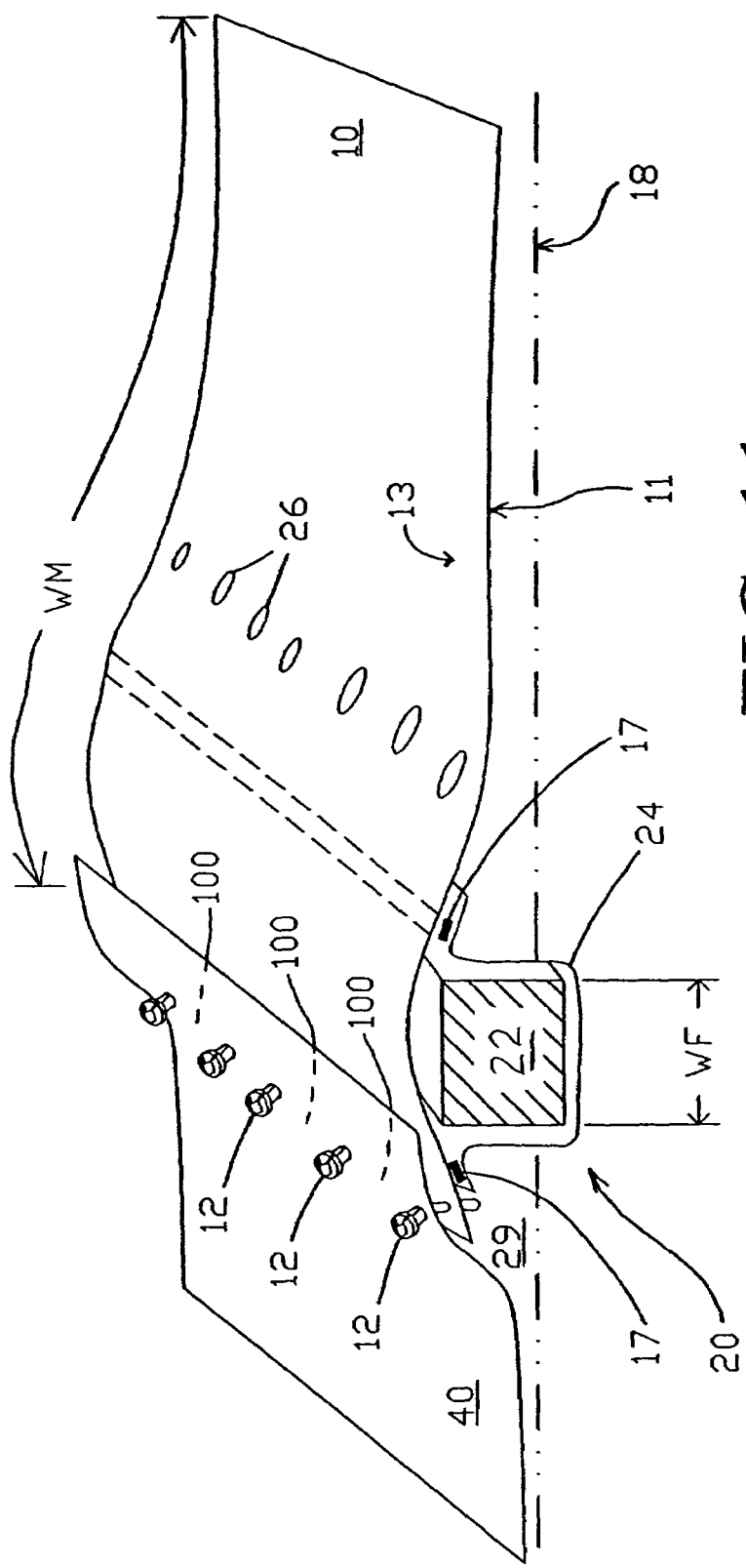
FIG. 11 depicts a perspective view of one embodiment of the present covers and covering systems that includes two membranes coupled to each other so as to form multiple gas-relief openings between them.

FIG. 11 shows gas-relief openings 100 as an alternative to gas-relief passageways 26. FIG. 11 illustrates membrane 10 coupled to flotation member 20, which includes float 22 and float compartment membrane 24. Float compartment membrane 24 is coupled to lower surface 11 of membrane 10 using welds 17. In coupling float compartment membrane to membrane 10, it will be understood by those of skill in the art that welds 17 can extend continuously along one or both of the edges of float compartment membrane 24 as evidenced by the dashed lines extending between two of the edges of membrane 10. Alternatively, welds at intermittent locations may be used. Gas-relief passageways 26 are positioned within membrane 10 and float compartment membrane 24 on the opposite side of flotation member 20 from fasteners 12. As shown in FIG. 11, width WF of float 22 is not more than 25 percent of width WM of membrane 10. Membrane 40 is coupled to upper surface 13 of membrane 10 using fasteners 12 positioned at intermittent, or spaced apart, locations. As a result, gas-relief openings 100 are defined between membrane 10 and membrane 40. Gas that collects in gas pocket 29 may pass through gas-relief openings 100. It is also possible for gas-relief openings to be created through the use of intermittent welds instead of intermittent fasteners.

Figure 14:
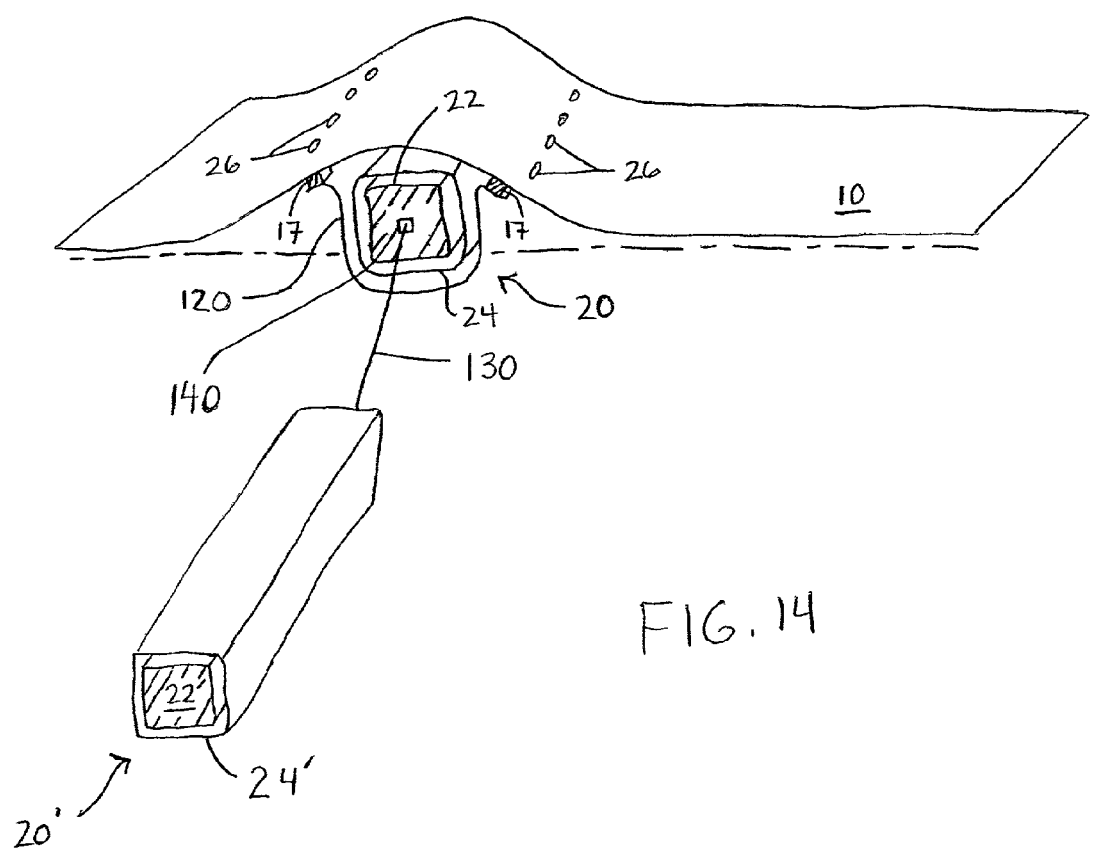
FIG. 14 depicts a perspective view of two flotation members coupled together with one of the present flotation member ties.

FIG. 14 shows an embodiment of the present covers and covering systems in which two flotation members are coupled through the use of flotation member tie 130. In the embodiment shown in FIG. 14, flotation member 20, which includes float 22 and float compartment membrane 24, is coupled to membrane 10 with at least one flotation member strap 120. Two pluralities of gas-relief passageways 26 positioned within membrane 10 and both being adjacent to flotation member 20 on alternate sides thereof. The flotation member strap shown is coupled to membrane 10 with welds 17. FIG. 14 also shows that another configuration, such as the one just described (but which is not completely illustrated), can be coupled to the configuration depicted with at least flotation member tie 130. Specifically, flotation member tie 130 is shown coupling flotation member 20 to flotation member 20'. As shown, flotation member tie 130 is coupled to float 22 at float tie link 140, which may take the form of a ring through which flotation member tie 130 can be threaded, and the like. The same float tie link, although not shown, may be provided on float 22'. Flotation member 20' is shown as including float 22' and float compartment membrane 24'. Although not shown, a membrane having two pluralities of gas-relief passageways can be coupled to flotation member 20' in the same fashion that membrane 10 is coupled to flotation member 20 in FIG. 14. Using flotation member ties in the fashion shown in FIG. 14 allows one to connect the ends of the present flotation members together to that the present covers and covering systems can be better adapted to a given fluid-retaining structure.

It will be understood by those of skill in the art that, although not depicted, it is possible to couple multiple flotation members to each other in end-to-end fashion as shown in FIG. 14 and couple those coupled flotation members to a single membrane, such as membrane 10 in FIG. 14. In such an embodiment, the flotation members may be connected to membrane 10 using any of the mechanisms disclosed herein, such as via welds, flotation member straps or ties, or fasteners. Furthermore, combinations of these securing mechanisms may be used. In such an embodiment, one of the present covers or covering systems would include a second flotation member coupled to the first membrane, wherein the second flotation member includes a second float and a second float compartment membrane, and wherein the second float compartment membrane is coupled to the first membrane. In this embodiment, one of the present covers or covering systems would also include a flotation member link coupling the first flotation member to the second flotation member.

The steps that it takes to achieve the present covers and covering systems, and to place those covers and covering systems over bodies containing at least come liquid, make up different embodiments of the present methods, which include venting methods, and more specifically, methods of venting gas from a body containing some liquid. In addition, the present methods may also, depending upon the application, include positioning any of the present covers and covering systems over a body containing some liquid to allow gas from the body to vent to atmosphere around the outer (or outside) edge of at least one of the membranes used to form the cover or covering system so positioned. This may be useful in covering small-sided basins or tanks, for example.

Advantageously, the present methods, covers, and covering systems may be utilized in any environment, and built to any size suited to the application. The membrane or membranes used may range in thickness from a few thousandths of one inch to several hundred thousandths of one inch thick. The float compartment membrane or membranes used may range in thickness from a few thousandths of one inch to several hundred thousandths of one inch thick. The materials used for the membranes, float compartment membranes and the like may float when placed on a liquid, such as water, that is more dense than the material. In addition, the present covers and covering systems may be built to be large enough that it is possible for people to safely walk across them.

All of the present covers, covering systems, and methods can be made and executed without undue experimentation in light of this disclosure. Additionally, while this invention have been described in terms of specific embodiments, it will be apparent to those of skill in the art that variations to the disclosed embodiments not specifically listed may be applied to achieve the present methods, covers, and covering systems without departing from the scope of the invention.

We claim:

1. A covering system comprising:
   a first membrane having a top surface and an opposing bottom surface;
   a first flotation member coupled to the first membrane, wherein the first flotation member includes a first float and a first float compartment membrane having an inside surface and an opposing outside surface, and wherein the first float compartment membrane is coupled to the first membrane; and
   a first plurality of gas-relief passageways positioned either:
      within the first float compartment membrane and extending between the inside and opposing outside surfaces, or
      within the first membrane, extending between the top and opposing bottom surfaces, and adjacent to the first flotation member;
   wherein at least one of the gas-relief openings within the first plurality is structured so that gas flows unobstructed through it when the system is used.

2. The covering system of claim 1, wherein the first float is sealed in the first float compartment membrane.

3. The covering system of claim 1, wherein the first float compartment membrane is coupled to either an upper surface or a lower surface of the first membrane, and wherein the first float is positioned between the first membrane and the first float compartment membrane.

4. The covering system of claim 1, wherein the first flotation member is coupled to the first membrane so as to elevate the first plurality of gas-relief passageways above at least a portion of the first membrane when the system is used.

5. The covering system of claim 1, further comprising:
   a second flotation member coupled to the first membrane, wherein the second flotation member includes a second float and a second float compartment membrane, the second float compartment membrane is coupled to the first membrane, and the second flotation member is spaced apart from the first flotation member; and
   a first elongated weight positioned on an upper surface of the first membrane and between the first and second flotation members.

6. The covering system of claim 5, further comprising:
   a second elongated weight positioned on an upper surface of the first membrane at an angle to either the first flotation member, the second flotation member, or the first elongated weight.

7. The covering system of claim 1, further comprising:
   an anchor system coupled to an edge of the first membrane, the anchor system comprising:
      a weighted member extending along and coupled to at least a portion of the edge of the first membrane.

8. The covering system of claim 7, wherein the anchor system further comprises a connector coupled to the edge of the first membrane.

9. The covering system of claim 8, wherein the connector includes a sleeve.

10. The covering system of claim 1, further comprising:
    a service opening positioned within the first membrane, the service opening being defined by a service opening edge and being spaced apart from the first flotation member and the first plurality of openings;
    a second flotation member coupled to the first membrane so as to elevate the service opening edge above a body containing some liquid when the system is used; and
    a service opening membrane coupled to the service opening edge.

11. The covering system of claim 10, further comprising:
    a service opening weight coupled to the service opening membrane and spaced apart from the service opening edge.

12. A venting method comprising:
    coupling a first membrane to a first flotation member, wherein the first flotation member includes a first float and a first float compartment membrane, and wherein the coupling includes coupling the first float compartment membrane to the first membrane, the first membrane having a top surface and an opposing bottom surface, and the first float compartment membrane having an inside surface and an opposing outside surface;
    forming gas-relief passageways either:
       within the first float compartment membrane and extending between the inside and opposing outside surfaces, or
       within the first membrane, extending between the top and opposing bottom surfaces, and adjacent to the first flotation member; and
    elevating at least a portion of the first membrane:
       so as to cause the first membrane to float when placed over a body containing some liquid; and
       so that gas from the body is directly vented to atmosphere through at least one of the gas-relief passageways.

13. The venting method of claim 12, wherein the coupling includes welding the first float compartment membrane to the first membrane.

14. A method of venting gas from a body containing some liquid, comprising:
- placing a covering system over the body, the covering system comprising:
  - a first membrane having an outer edge and a width;
  - a first flotation member coupled to the first membrane, wherein the first flotation member includes a first float and a first float compartment membrane, the first float has a width that is not more than twenty-five percent of the width of the first membrane and a first float compartment membrane, and the first float compartment membrane is coupled to the first membrane;
- elevating portions of the first membrane above the body; and
- positioning the covering system to allow gas from the body to vent directly to atmosphere around the outer edge of the first membrane.

* * * * *